United States Patent Office 3,584,032
Patented June 8, 1971

3,584,032
PREPARATION OF ALKYL 1-(CARBAMOYL)-N-(CARBAMOYLOXY)THIOFORMIMIDATES
Julius J. Fuchs, Wilmington, Del., assignor to E. I. du Pont de Nemours and Company, Wilmington, Del.
No Drawing. Filed Nov. 1, 1968, Ser. No. 772,811
Int. Cl. C07c 125/06
U.S. Cl. 260—482                        21 Claims

ABSTRACT OF THE DISCLOSURE

Alkyl 1 - (carbamoyl)-N-(carbamoyloxy)thioformimidates such as methyl 1-(carbamoyl)-N-(methylcarbamoxyloxy)thioformimidate and methyl 1-(dimethylcarbamoyl)-N-(methylcarbamoyloxy)thioformimidate are prepared by the steps of
(a) reacting glyoxylic acid and hydroxylamine hydrochloride in the presence of a base and water or alcohol;
(b) acidifying and esterifying the product of (a) by heating in the presence of an alcohol;
(c) chlorinating the product of (b) after cooling to −10 to 35° C.;
(d) reacting the hydroxamoyl chloride formed in (c) with an alkyl mercaptan and then adding a base;
(e) reacting the product of (d) with 2 moles of ammonia or an amine in the presence of water or an alcohol; and
(f) reacting the product of (e) with either
   (1) a carbamoyl chloride, optionally in the presence of a base; or
   (2) an isocyanate, optionally in the presence of a basic catalyst, in water or organic solvents such as acetone and methylene chloride.

BACKGROUND AND SUMMARY

This invention is directed to the preparation of alkyl 1-(carbamoyl)-N-(carbamoyloxy)thioformimidates of the following formula (1) $\quad \begin{array}{c} R_3 \\ \diagdown \\ R_2 \end{array} N - \overset{O}{\underset{\|}{C}} - \underset{\underset{S-R_1}{|}}{C} = N - O - \overset{O}{\underset{\|}{C}} - N \begin{array}{c} \diagup R_4 \\ \diagdown R_5 \end{array}$ wherein:
$R_1$ is alkyl of 1 through 4 carbon atoms or alkenyl of 3 through 4 carbon atoms;
$R_2$ is hydrogen, alkyl of 1 through 4 carbon atoms, alkenyl of 3 through 4 carbon atoms, methoxy, or cycloalkyl of 3 through 5 carbon atoms;
$R_3$ is hydrogen, alkyl of 1 through 4 carbon atoms or alkenyl of 3 through 4 carbon atoms; with the proviso that $R_2$ and $R_3$ can be joined and are alkylene of 2 through 6 carbon atoms, and with the limitation that $R_2$ and $R_3$ never total more than 7 carbon atoms;
$R_4$ is alkyl of 1 through 3 carbon atoms, allyl or propargyl; and
$R_5$ is hydrogen or methyl;
by the steps comprising:

(a) reacting glyoxylic acid and hydroxylamine in the presence of a base and water, methanol, ethanol, isopropanol or their mixtures;
(b) acidifying and esterifying the product of (a) by heating in the presence of one of the above alcohols;
(c) cooling the product of (b) to −10 to 35° C. and chlorinating;
(d) reacting the product of (c) with an alkyl mercaptan then adding base to the reaction mixture;
(e) aminating the product of (d) with 2 moles of ammonia or an amine in the presence of water or alcohol; and (f) reacting the product of (e) with a carbamoyl chloride or an isocyanate in water, acetone, methylene chloride, methyl ethyl ketone, or methyl isobutyl ketone in the presence or absence of a basic catalyst.

The compounds of Formula 1 and their use as pesticides are described and exemplified in application Ser. No. 728,739, filed May 13, 1968.

The process of this invention used in preparing the compounds of Formula 1 comprises the six steps enumerated above, and more fully described as follows:

Step (a)

The reaction of glyoxylic acid and hydroxylamine hydrochloride in the presence of a base, and water or an alcohol, is represented by the following equation:

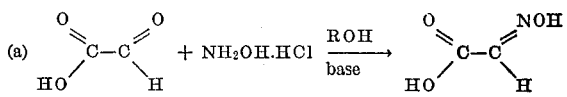

in which R is hydrogen, methyl, ethyl or isopropyl, and the base is a hydroxide, carbonate or bicarbonate of sodium, potassium, calcium or magnesium.

The acid, hydroxylamine hydrochloride and base are stirred together in the solvent. The reaction temperature is not critical and ambient temperatures are preferred for economy and convenience. At the conclusion of the reaction the product can be isolated by conventional techniques such as concentration and crystallization, or extraction with an organic solvent. However, it is ordinarily preferred to run the step (a) reaction in the alcohol to be used in the step (b) esterification making isolation of the step (a) product unnecessary.

Step (b)

The esterification of the glyoxylic acid oxime is represented by the following equation

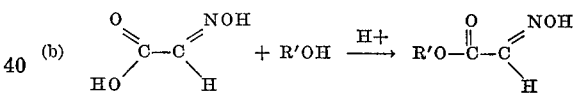

wherein R' is methyl, ethyl, or isopropyl.

Step (b) is carried out by dissolving the glyoxylic acid oxime in an excess of alcohol, if not already in alcohol solution, and adding a trace of a mineral acid such as hydrochloric or sulfuric acid. The resulting mixture is heated to complete esterification, ordinarily to a temperature of from 50 to 100° C.

Some of the solvent is sometimes distilled off during esterification to remove any water present or formed during reaction and thereby force the reaction to completion.

The product is ordinarily isolated by distilling off the remainder of the solvent and can be purified by distillation at reduced pressure if desired.

Step (c)

Step (c) comprises formation of the hydroxamoyl chloride and is illustrated by the equation

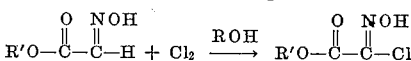

wherein R is hydrogen, methyl, ethyl or isopropyl.

If the ester of step (b) has been isolated or purified, it is preferred to mix the ester with water, cool the mixture and add chlorine. If the ester has not been isolated from the alcoholic medium of step (b) the product mixture is cooled and chlorinated without adding water.

The chlorination should be carried out at a temperature between −10° C. and 35° C. and preferably between −10° C. and 0° C. The amount of chlorine used will vary from stoichiometric to 5% molar excess but it is preferred to use stoichiometric amounts.

Step (d)

The hydroxamoyl chloride from step (c) is reacted with an alkyl mercaptan in a solvent and then the pH is raised by addition of a base according to the equation

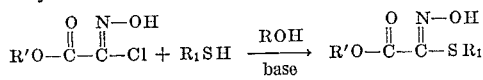

$$R'O-\underset{\underset{O}{\|}}{C}-\underset{\underset{N-OH}{\|}}{C}-Cl + R_1SH \xrightarrow[\text{base}]{ROH} R'O-\underset{\underset{O}{\|}}{C}-\underset{\underset{N-OH}{\|}}{C}-SR_1$$

wherein $R_1$ is as defined above, and R is hydrogen, methyl, ethyl or isopropyl.

The hydroxamoyl chloride is preferably used without isolation from the solvent of step (C). For best yields the reaction product of step (c) is cooled to below 20° C. prior to addition of the mercaptan. A temperature range of 0 to −10° C. is most preferred.

Bases suitable for adjusting the pH are the hydroxides, carbonates and bicarbonates of sodium, potassium, calcium and magnesium. The final pH should be between 5 and 9 and a pH of about 7 is preferred.

The product can be isolated if desired by conventional techniques such as filtration, solvent, extraction or distillation. Alternatively, the product mixture can be used as is in step (e).

Step (e)

The product of step (d) is reacted with an amine in the presence of water, methanol, ethanol, isopropanol or their mixtures according to the equation

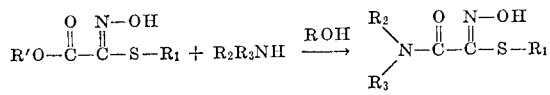

$$R'O-\underset{\underset{O}{\|}}{C}-\underset{\underset{N-OH}{\|}}{C}-S-R_1 + R_2R_3NH \xrightarrow{ROH} \underset{R_3}{\overset{R_2}{\diagdown}}N-\underset{\underset{O}{\|}}{C}-\underset{\underset{N-OH}{\|}}{C}-S-R_1$$

wherein R is hydrogen, methyl ethyl, or isopropyl, and $R_2$ and $R_3$ are as defined above.

If the product of step (d) was isolated it is first dispersed with stirring in the solvent medium, preferably in one of the alcohols or their mixtures.

To this mixture is added approximately 2 moles of ammonia, or a primary or secondary amine. A tertiary amine such as trimethylamine can be substituted for one mole of these amines with about the same results. Two moles of amine are necessary because one mole forms a salt with the oxime function while another mole participates directly in the reaction.

The product of step (e) can be isolated in a conventional manner such as by filtration or evaporation of the solvent. It is desirable to isolate this product or at least to remove any excess ammonia or amine, prior to performing the reaction of step (f).

Step (f)

Conversion of the product of step (e) to the oxime carbamate is carried out by reacting the product of step (e) with an isocyanate or carbamoyl chloride according to the equation

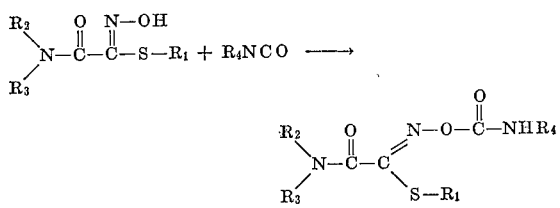

$$\underset{R_3}{\overset{R_2}{\diagdown}}N-\underset{\underset{O}{\|}}{C}-\underset{\underset{N-OH}{\|}}{C}-S-R_1 + R_4NCO \longrightarrow$$

$$\underset{R_3}{\overset{R_2}{\diagdown}}N-\underset{\underset{S-R_1}{}}{C}=\underset{\underset{}{}}{C}\overset{N-O-\underset{\underset{O}{\|}}{C}-NHR_4}{\diagup}$$

wherein $R_4$ is alkyl or 1 through 3 carbon atoms, allyl or propargyl, and $R_1$, $R_2$ and $R_3$, are as defined above, or

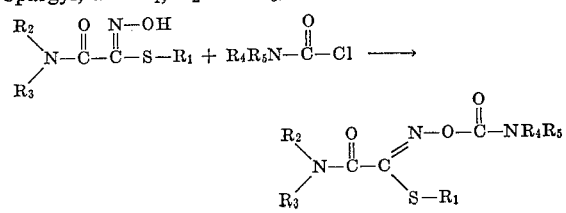

$$\underset{R_3}{\overset{R_2}{\diagdown}}N-\underset{\underset{O}{\|}}{C}-\underset{\underset{N-OH}{\|}}{C}-S-R_1 + R_4R_5N-\underset{\underset{O}{\|}}{C}-Cl \longrightarrow$$

$$\underset{R_3}{\overset{R_2}{\diagdown}}N-\underset{\underset{S-R_1}{}}{C}=\underset{\underset{}{}}{C}\overset{N-O-\underset{\underset{O}{\|}}{C}-NR_4R_5}{\diagup}$$

wherein $R_5$ is hydrogen or methyl and $R_1$, $R_2$, $R_3$, and $R_4$ are as defined above.

The reactions of step (f) are carried out in a solvent such as water, acetone, methyl ethyl ketone, methyl isobutyl ketone, or methylene chloride, at a temperature which can range from below −10° C. to the boiling point of the solvent. The reaction of step ($f_1$) is facilitated by the presence of a basic catalyst such as trimethylamine or triethylenediamine. The reaction of step ($f_2$) is advantageously carried out in the presence of a base such as triethylamine, trimethylamine or the hydroxides, carbonates or bicarbonates of sodium, potassium, calcium or magnesium.

The alkyl 1-(carbamoyl)-N-(carbamoyloxy)thioformimidate products of step (f) can be isolated by conventional procedures such as filtration or extraction.

Of the steps (a) through (f) the most important is step (c) which provides an advantageous method of preparing the hydroxamoyl chloride. A preferred sequence of reaction is to chlorinate in a step (c) reaction, a previously obtained ester prepared by an suitable process and follow this chlorination with the step (d), (e), and (f).

The process of this invention is further illustrated in the following examples wherein parts and percentages are by weight unless otherwise noted.

EXAMPLE 1

To a solution of 500 parts of glyoxylic acid (78.5% purity) and 370 parts of hydroxylamine hydrochloride in 1000 parts of methanol, are gradually added 281 parts of anhydrous sodium carbonate without cooling and with good agitation. When gas evolution stops, heat is applied and methanol begins, distilling off. When the temperature of the reaction mass reaches 80° C., fresh methanol is added to replace that being distilled off. The first 500 parts of methanol added contain 8 parts of concentrated sulfuric acid. The rate of methanol addition is regulated so that the temperature in the reaction vessel remains between 80° and 85° C. This operation is continued until the water content of the distillate is below 0.5%. At this point esterification is practically complete. The precipitated salt is then filtered off, the filter cake is rinsed with methanol, and the rinse is combined with the filtrate.

Methyl glyoxylate oxime is isolated from the filtrate by evaporation of the methanol and distillation of the product at 67° C. and 0.5 mm. Hg. The intermediate methyl glyoxylate oxime which solidifies in the receiver exhibits a melting point of 56–58° C. and is obtained in a yield of 88%.

A solution of 206 parts of methyl glyoxylate oxime in 1500 parts of water is treated in about 35 minutes at 0 to −5° C. with 145 parts of chlorine. The 1-(methoxycarbonyl)formhydroxamoyl chloride formed, can be isolated from the product oil by extraction with methylene chloride, evaporation of the methylene chloride, and recrystallization of the residue from benzene. Upon isolation the product exhibits a melting point of 63–65° C.

The product oil can be treated without isolation by adding 110 parts of methyl mercaptan at 0 to −5° C., followed by 330 parts of 50% aqueous sodium hydroxide mixed with 330 parts of water, to give a pH of about 7. The resulting two-phase reaction mass is then extracted with methylene chloride. Removal of the solvent under reduced pressure leaves solid methyl 1-(methoxycarbonyl)-N-hydroxythioformimidate which can be recrystallized from benzene to give a pure product with a melting point of 63–64° C.

The crude methyl 1-(methoxycarbonyl)-N-hydroxythioformimidate obtained above is dissolved in 400 parts of concentrated aqueous ammonia at a temperature below 30° C. The solution is allowed to stand overnight. After removal of a small amount of undissolved material by filtration, the filtrate is concentrated under reduced pressure to give 190 parts (71% yield) of methyl 1-(carbamoyl)-N-hydroxythioformimidate, melting point 163–164° C.

To a suspension of 400 parts of methyl 1-carbamoyl-N-hydroxythioformimidate and 1 part of triethylenediamine in 2000 parts of acetone at 40° C. are added slowly 171 parts of methyl isocyanate. The temperature of the reaction mixture rises to 58° C. and then subsides to 25° C. At this point the reaction mass is cooled to 0° C. and 547 parts (96% yield) of the product methyl 1-(carbamoyl)-N-(methylcarbamoyloxy)thioformamimidate is filtered off. The product has a melting point of 161–165° C.

The compounds of Table I are prepared by the procedures of Example 1, using the mercaptans and isocyanates listed in place of the methyl mercaptan and methyl isocyanate of Example 1.

This solution is allowed to stand at ambient temperature overnight. Removal of excess dimethylamine and the solvent under reduced pressure leaves 240 parts (74%) of methyl 1-(dimethylcarbamoyl) - N - hydroxythioformimidate.

To a suspension of 70 parts of methyl 1-(dimethylcarbamoyl)-N-hydroxythioformimidate and ½ part of triethylenediamine in 350 parts of acetone at 40° C. is added slowly 27 parts of methyl isocyanate. The temperature of the reaction mixture rises to 58° C. After the temperature of the reaction mass has subsided to 25° C., the solvent is evaporated under reduced pressure, and the resulting residue recrystallized. Recrystallization from benzene gives one isomer of methyl 1-(dimethylcarbamoyl)-N-(methylcarbamoyloxy)thioformimidate, melting point 109–110° C. Recrystallization from water gives the other isomer of

TABLE I

| Mercaptan | Isocyanate | Product |
|---|---|---|
| Ethyl mercaptan | Methyl isocyanate | Eethyl 1-carbamoyl-N-(methylcarbamoyloxy)thioformimidate. |
| Allyl mercaptan | do | Allyl 1-carbamoyl-N-(methylcarbamoyloxy)thioformimidate. |
| But-2-enyl mercaptan | Ethyl isocyanate | But-2-enyl 1-carbamoyl-N-(ethylcarbamoyloxy)thioformimidate. |
| Isopropyl mercaptan | Allyl isocyanate | Isopropyl 1-carbamoyl-N-(allylcarbamoyloxy)thioformimidate. |
| Methyl mercaptan | Propargyl isocyanate | Methyl 1-carbamoyl-N-(propargylcarbamoyloxy)thioformimidate. |
| Propyl mercaptan | Methyl isocyanate | Propyl 1-carbamoyl-N-(methylcarbamoyloxy)thioformimidate. |
| Allyl mercaptan | Allyl isocyanate | Allyl 1-carbamoyl-N-(allylcarbamoyloxy)thioformimidate. |
| Isopropyl mercaptan | Methyl isocyanate | Isopropyl 1-carbamoyl-N-(methylcarbamoyloxy)thioformimidate. |
| Butyl mercaptan | do | Butyl 1-carbamoyl-N-(methylcarbamoyloxy)thioformimidate. |
| Sec-butyl mercaptan | do | Sec-butyl 1-carbamoyl-N-(methylcarbamoyloxy)thioformimidate. |
| tert-Butyl mercaptan | do | tert-Butyl 1-carbamoyl-N-(methylcarbamoyloxy)thioformimidate. |
| Methyl mercaptan | Ethyl isocyanate | Methyl 1-carbamoyl-N-(ethylcarbamoyloxy)thioformimidate. |
| Butyl mercaptan | do | Butyl 1-carbamoyl-N-(ethylcarbamoyloxy)thioformimidate. |
| Methyl mercaptan | Isopropyl isocyanate | Methyl 1-carbamoyl-N-(isopropylcarbamoyloxy)thioformimidate. |
| Butyl mercaptan | do | Butyl 1-carbamoyl-N-(isopropylcarbamoyloxy)thioformimidate. |
| Allyl mercaptan | do | Allyl 1-carbamoyl-N-(isopropylcarbamoyloxy)thioformimidate. |
| Do | n-Propyl isocyanate | Allyl 1-carbamoyl-N-(n-propylcarbamoyloxy)thioformimidate. |
| Methyl mercaptan | Allyl isocyanate | Methyl 1-carbamoyl-N-(allylcarbamoyloxy)thioformimidate. |
| Butyl mercaptan | do | Butyl 1-carbamoyl-N-(allylcarbamoyloxy)thioformimidate. |
| Allyl mercaptan | Propargyl isocyanate | Allyl 1-carbamoyl-N-(propargylcarbamoyloxy)thioformimidate. |

EXAMPLE 2

Crude methyl 1-methoxycarbonyl-N-hydroxythioformimidate obtained as in Example 1 above, is dissolved in 250 parts of methanol and 180 parts of anhydrous dimethylamine is dissolved in the solution below 30° C.

methyl 1-(dimethylcarbamoyl)-N-(methylcarbamoyloxy)thioformimidate, melting point 101–103° C.

The compounds of Table II are prepared according to the procedures of Examples 1 and 2, using the mercaptans, amines, and isocyanates listed in place of methyl mercaptan, dimethylamine and methyl isocyanate.

TABLE II

| Mercaptan | Amine | Isocyanate | Product |
|---|---|---|---|
| Methyl mercaptan | Methylamine | Methyl isocyanate | Methyl 1-(methylcarbamoyl)-N-(methylcarbamoyloxy)thioformimidate. |
| Do | Butylamine | do | Methyl 1-(butylcarbamoyl)-N-(methylcarbamoyloxy)thioformimidate. |
| Isopropyl mercaptan | Cyclopropylamine | do | Isopropyl 1-(cyclopropylcarbamoyl)-N-(methylcarbamoyloxy)thioformimidate. |
| Allyl mercaptan | N,O-dimethylhydroxylamine | Ethyl isocyanate | Allyl 1-(N-methoxy-N-methylcarbamoyl)-N-(ethylcarbamoyloxy)thioformimidate. |
| Butyl mercaptan | Allylamine | do | Butyl 1-(allylcarbamoyl)-N-(ethylcarbamoyloxy)thioformimidate. |
| Methyl mercaptan | Diallylamine | Allyl isocyanate | Methyl 1-(diallylcarbamoyl)-N-(allylcarbamoyloxy)thioformimidate. |
| Ethyl mercaptan | Isopropylamine | do | Ethyl 1-(isopropylcarbamoyl)-N-(allylcarbamoyloxy)thioformimidate. |
| Methyl mercaptan | Ethylamine | Propargyl isocyanate | Methyl 1-(ethylcarbamoyl)-N-(propargylcarbamoyloxy)thioformimidate. |
| Do | Diethylamine | Methyl isocyanate | Methyl 1-(diethylcarbamoyl)-N-(methylcarbamoyloxy)thioformimidate. |
| Do | Diisopropylamine | do | Methyl 1-(diisopropylcarbamoyl)-N-(methylcarbamoyloxy)thioformimidate. |
| Ethyl mercaptan | But-2-enylamine | Isopropyl isocyanate | Ethyl 1-(but-2-enylcarbamoyl)-N-isopropylcarbamoyloxy)thioformimidate. |
| Methyl mercaptan | Aziridine | Methyl isocyanate | Methyl 1-(aziridinocarbonyl)-N-(methylcarbamoyloxy)thioformimidate. |
| Do | Hexahydroazepine | do | Methyl 1-(hexahydroazepinocarbonyl)-N-(methylcarbamoyloxy)thioformimidate. |
| Do | Pyrrolidine | do | Methyl 1-(pyrrolidinocarbonyl)-N-(methylcarbamoyloxy)thioformimidate. |
| Do | Methylamine | Allyl isocyanate | Methyl 1-(methylcarbamoyl)-N-(allylcarbamoyloxy)thioformimidate. |
| Do | Dimethylamine | Propargyl isocyanate | Methyl 1-(dimethylcarbamoyl)-N-(propargycarbamoyloxy)thioformimidate. |
| Do | Allylamine | do | Methyl 1-(allylcarbamoly)-N-(propargylcarbomoyloxy)thioformimidate. |
| Do | N,O-dimethylhydroxylamine | Methyl isocyanate | Methyl 1-(N-methoxy-N-methylcarbamoyl)-N-(methylcarbamoyloxy)thioformimidate. |
| Do | N-methyl-N-ethylamine | Allyl isocyante | Methyl 1-(N-ethylcarbamyol-N-(allylcarbamoyloxy)thioformimidate. |
| Ethyl mercaptan | Piperidine | do | Ethyl 1-(piperidinocarbonyl)-N-(allylcarbamoyloxy)thioformimidate. |
| Do | do | Butyl isocyanate | Ethyl 1-(piperidinocarbonyl)-N-(butylcarbamoyloxy)thioformimidate. |
| Butyl mercaptan | do | Methyl isocyanate | Butyl 1-(piperidinocarbonyl)-N-(methylcarbamoyloxy)thioformimidate. |
| Do | do | Butyl isocyanate | Butyl 1-(piperidinocarbonyl)-N-(butylcarbamoyloxy)thioformimidate. |
| Methyl mercaptan | N-methyl-N-butylamine | Methyl isocyanate | Methyl 1-(N-methyl-N-butylcarbamoyl)-N-(methylcarbamoyloxy)thioformimidate. |
| Do | N-methyl-N-allylamine | do | Methyl 1-(N-methyl-N-allylcarbamoyl)-N-(methylcarbamoyloxy)thioformimidate. |

EXAMPLE 3

The methanolic solution of methyl glyoxylate oxime obtained by reaction of 215 parts glyoxylic acid with equivalent parts of hydroxylamine hydrochloride, sodium carbonate, then methanol and sulfuric acid, as described in Example 1, is cooled to −5° C. and treated with 145 parts of chlorine in about 35 minutes at −5 to −10° C. To the resulting reaction mixture are then added at −5 to 10° C., 110 parts of methyl mercaptan followed by 375 parts of 50% aqueous sodium hydroxide mixed with 500 parts of methanol, to give a pH of about 7. In the resulting reaction mixture are then dissolved, below 30° C., 180 parts of anhydrous dimethylamine, and the reaction mixture allowed to stand at ambient temperature overnight. Evaporation of the methanol and excess dimethylamine leaves a mixture of inorganic salts and methyl 1-(dimethylcarbamoyl)-N-hydroxythioformimidate, which are separated from each other by dissolving the inorganic salts in water and removing the organic compound by filtration.

The conversion of the methyl 1-(dimethylcarbamoyl)-N-hydroxythioformimidate to the methyl 1-(dimethylcarbamoyl)-N-(methylcarbamoyloxy)thioformimidate is carried out as described in Example 2.

EXAMPLE 4

To a stirred suspension of 48 parts of 50% sodium hydride and mineral oil in 648 parts of tetrahydrofuran is added portion-wise over a one-hour period 114 parts of methyl 1-(carbamoyl)-N-hydroxythioformimidate. The temperature is maintained at 20 to 30° C. After subsidence of hydrogen evolution, 107.5 parts of dimethylcarbamoyl chloride is added dropwise at 15–25° C. Stirring is continued for one hour after the completion of addition. The inorganic solids are then removed by filtration and the methyl 1-carbamoyl-N-(dimethylcarbamoyloxy)-thioformimidate is recovered by removal of the solvent under reduced pressure.

The compounds of Table III are prepared according to the procedures of Example 4, using the N-hydroxythioformimidates and carbamoyl chlorides listed in place of methyl 1-(carbamoyl)-N-hydroxythioformimidate and dimethylcarbamoyl chloride.

alkenyl of 3 through 4 carbon atoms, methoxy or cycloalkyl of 3 through 5 carbon atoms;

$R_3$ is hydrogen, alkyl of 1 through 4 carbon atoms, or alkenyl of 3 through 4 carbon atoms; with the proviso that $R_2$ and $R_3$ can be taken together and are alkylene of 2 through 6 carbon atoms, and with the limitation that $R_2$ and $R_3$ never total more than 7 carbon atoms;

$R_4$ is alkyl of 1 through 3 carbon atoms, allyl or propargyl; and $R_5$ is hydrogen or methyl;

by the steps comprising (a) reacting glyoxylic acid and hydroxylamine in the presence of a hydroxide, carbonate or bicarbonate of sodium, potassium, calcium or magnesium, and water, methanol, ethanol, isopropanol or their mixtures;

(b) acidifying and esterifying the product of step (a) by heating the product in the presence of methanol, ethanol, or isopropanol;

(c) cooling the product of step (b) to a temperature of from −10 to 35° C. and chlorinating the cooled product in the presence of water, methanol, ethanol, isopropanol or their mixtures;

(d) reacting the product of step (c) with an alkyl mercaptan of the formula $$R_1SH$$

wherein $R_1$ is as defined above; and then raising the pH to the range of 5–9 by the addition of a hydroxide carbonate or bicarbonate of sodium, potassium, calcium or magnesium;

(e) aminating the product of step (d) with about 2 moles per mole of product of ammonia, a primary amine or a secondary amine in the presence of water, methanol, ethanol, isopropanol or their mixtures; and (f) reacting the product of step (e) with an appropriate isocyanate or carbamoyl chloride in the presence of water, acetone, methylene chloride, methyl ethyl ketone, or methyl isobutyl ketone and in the presence or absence of a basic catalyst.

2. The process of claim 1 wherein amination is carried out with ammonia.

TABLE III

| N-hydroxythioformimidate | Carbamoyl chloride | Product |
| --- | --- | --- |
| Methyl 1-carbamoyl-N-hydroxythioformimidate. | N-allyl-N-methylcarbamoyl chloride. | Methyl 1-carbamoyl-N-(N-allyl-N-methylcarbamoyloxy)thioformimidate. |
| Do. | N-methyl-N-propargylcarbamoyl chloride. | Methyl 1-carbamoyl-N-(N-methyl-N-propargylcarbamoyloxy)thioformimidate. |
| Do. | N-methyl-N-propylcarbamoyl chloride. | Methyl 1-carbamoyl-N-(N-methyl-N-propylcarbamoyloxy)thioformimidate. |
| Do. | N-ethyl-N-methylcarbamoyl chloride. | Methyl 1-carbamoyl-N-(N-ethyl-N-methylcarbamoyloxy)thioformimidate. |
| Methyl 1-methylcarbamoyl-N-hydroxythioformimidate. | Dimethylcarbamoyl chloride. | Methyl 1-(methylcarbamoyl)-N-(dimethylcarbamoyloxy)thioformimidate. |
| Methyl 1-dimethylcarbamoyl-N-hydroxythioformimidate. | do. | Methyl 1-(dimethylcarbamoyl)-N-(dimethylcarbamoyloxy)thioformimidate. |
| Methyl 1-cyclopentylcarbamoyl-N-hydroxythioformimidate. | do. | Methyl 1-(cyclopentylcarbamoyl)-N-(dimethylcarbamoyloxy)thioformimidate. |
| Propyl 1-carbamoyl-N-hydroxythioformimidate. | do. | Propyl 1-carbamoyl-N-(dimethylcarbamoyloxy)thioformimidate. |
| Ethyl 1-carbamoyl-N-hydroxythioformimidate. | do. | Ethyl 1-carbamoyl-N-(dimethyl-N-(dimethylcarbamoyloxy)thioformimidate. |
| Butyl 1-carbamoyl-N-hydroxythioformimidate. | do. | Butyl 1-carbamoyl-N-(dimethylcarbamoyloxy)thioformimidate. |
| Methyl 1-piperdinocarbonyl-N-hydroxythioformimidate. | do. | Methyl 1-piperidinocarbonyl-N-(dimethylcarbamoyloxy)thioformimidate. |
| Allyl 1-carbamoyl-N-hydroxythioformimidate. | do. | Allyl 1-carbamoyl-N-(dimethylcarbamoyloxy)thioformimidate. |
| But-2-enyl 1-carbamoyl-N-hydroxythioformimidate. | do. | But-2-enyl 1-carbamoyl-N-(dimethylcarbamoyloxy)thioformimidate. |

I claim:

1. A process for preparing 1-(carbamoyl)-N-(carbamoyloxy)thioformimidates of the formula

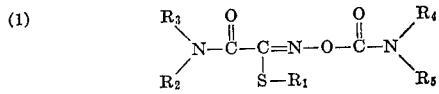

(1)

wherein $R_1$ is alkyl of 1 through 4 carbon atoms or alkenyl of 3 through 4 carbon atoms;

$R_2$ is hydrogen, alkyl of 1 through 4 carbon atoms,

3. The process of claim 1 wherein amination is carried out with dimethylamine.

4. The process of claim 1 wherein step (a) is carried out in methanol, ethanol or isopropanol.

5. The process of claim 1 wherein step (c) is carried out at a temperature between −10° C. and 0° C.

6. The process of claim 1 wherein step (d) is carried out after cooling to a temperature below 20° C.

7. The process of claim 1 wherein step (e) is carried out in methanol, ethanol, isopropanol or their mixtures.

8. The process of claim 1 wherein excess ammonia or amine are removed after step (e) and prior to step (f).

9. The process of claim 1 wherein step (f) is carried out using an isocyanate and trimethylamine or triethylenediamine as the basic catalyst.

10. The process of claim 1 wherein step (f) is carried out using a carbamoyl chloride and triethylamine, trimethylamine, or a hydroxide, carbonate or bicarbonate of sodium, potassium, calcium or magnesium as the basic catalyst.

11. A process for preparing alkyl 1-(carbamoyl)-N-(carbamoyloxy)thioformimidates of the formula (1) 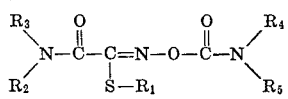

wherein
$R_1$ is alkyl of 1 through 4 carbon atoms or alkenyl of 3 through 4 carbon atoms;
$R_2$ is hydrogen, alkyl of 1 through 4 carbon atoms, alkenyl of 3 through 4 carbon atoms, methoxy or cycloalkyl of 3 through 5 carbon atoms;
$R_3$ is hydrogen, alkyl of 1 through 4 carbon atoms, or alkenyl of 3 through 4 carbon atoms; with the proviso that $R_2$ and $R_3$ can be taken together and are alkylene of 2 through 6 carbon atoms, and with the limitation that $R_2$ and $R_3$ never total more than 7 carbon atoms;
$R_4$ is alkyl of 1 through 3 carbon atoms, allyl or propargyl; and
$R_5$ is hydrogen or methyl;
by the steps comprising
(1) reacting an appropriate ester of glyoxylic acid oxime with chlorine at a temperature between −10 and 35° C. in the presence of water, methanol, ethanol, isopropanol or their mixtures;
(2) reacting the product of step (1) with an alkyl mercaptan of the formula $R_1SH$ wherein $R_1$ is as defined above; and then raising the pH to the range of 5–9 by the addition of a hydroxide, carbonate or bicarbonate of sodium, potassium, calcium or magnesium;
(3) aminating the product of step (2) with about 2 moles per mole of product of ammonia, a primary amine, or a secondary amine in the presence of water, methanol, ethanol, isopropanol or their mixtures; and
(4) reacting the product of step (3) with an appropriate isocyanate or carbamoyl chloride in the presence of water, acetone, methylene chloride, methyl ethyl ketone, or methyl isobutyl ketone and in the presence or absence of a basic catalyst.

12. The process of claim 11 wherein step (1) is carried out at a temperature between −10° C. and 0° C.

13. The process of claim 11 wheretin step (2) is carried out after cooling to a temperature below 20° C.

14. The process of claim 11 wherein step (3) is carried out in methanol, ethanol, isopropanol, or their mixtures.

15. The process of claim 11 wherein step (3) is carried out using ammonia.

16. The process of claim 11 wherein steep (3) is carried out using dimethylamine.

17. The process of claim 11 wherein excess ammonia or amine are removed after step (3).

18. The process of claim 11 wherein step (4) is carried out using an isocyanate and trimethylamine or triethylenediamine as the basic catalyst.

19. The process of claim 11 wherein step (4) is carried out using a carbamoyl chloride and triethylamine, trimethylamine, or a hydroxide, carbonate or bicarbonate of sodium, potassium, calcium or magnesium as the basic catalyst.

20. A process for chlorinating esters of glyoxylic acid oxime of the formula

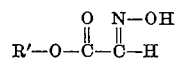

wherein R' is methyl, ethyl or isopropyl comprising reacting the ester with chlorine at a temperature between −10 and 35° C. in water, methanol, ethanol, isopropanol, or their mixtures, the chlorine being used in an amount of about 1 mole per mole of ester.

21. The process of claim 20 wherein the reaction is carried out at a temperature between −10° C. and 0° C.

References Cited

UNITED STATES PATENTS 3,303,199  2/1967  Doebel _____ 260—566X

FOREIGN PATENTS 1,186,468  2/1965  Germany _____ 260—482

OTHER REFERENCES

Naller, C. R.: Organic Chemisty, 2nd ed., p. 285.

LORRAINE A. WEINBERGER, Primary Examiner

P. J. KILLOS, Assistant Examiner

U.S. Cl. X.R.

260—239, 293.4, 326.3, 481, 534, 557, 561